United States Patent
Chen et al.

(10) Patent No.: US 9,950,377 B2
(45) Date of Patent: Apr. 24, 2018

(54) PLURAL RESISTANCE-CAPACITANCE (PRC) ELECTRICAL DISCHARGE MACHINING SYSTEM

(71) Applicant: National Taiwan Normal University, Taipei (TW)

(72) Inventors: Shun-Tong Chen, Taipei (TW); Chi-Hung Chen, Taipei (TW); Po-Yuan Shih, Taipei (TW)

(73) Assignee: National Taiwan Normal University, Taipei (TW)

( * ) Notice: Subject to any disclaimer, the term of this patent is extended or adjusted under 35 U.S.C. 154(b) by 691 days.

(21) Appl. No.: 14/560,460

(22) Filed: Dec. 4, 2014

(65) Prior Publication Data
US 2015/0343544 A1 Dec. 3, 2015

(30) Foreign Application Priority Data

May 30, 2014 (CN) .................................. 103118922

(51) Int. Cl.
*B23H 1/02* (2006.01)
(52) U.S. Cl.
CPC ............ *B23H 1/02* (2013.01); *B23H 2300/20* (2013.01)
(58) Field of Classification Search
CPC ....... B23H 1/022; B23H 2300/20; B23H 1/02
See application file for complete search history.

(56) References Cited

U.S. PATENT DOCUMENTS

| | | | | | |
|---|---|---|---|---|---|
| 3,987,271 A | * | 10/1976 | Bell, Jr. | ................. | B23H 1/028 219/69.13 |
| 4,071,729 A | * | 1/1978 | Bell, Jr. | ................... | B23H 7/20 219/69.13 |
| 4,320,279 A | * | 3/1982 | Bell, Jr. | ................... | B23H 7/20 219/69.18 |

(Continued)

FOREIGN PATENT DOCUMENTS

CN     101468415 A     7/2009
JP     56-21728 A *     2/1981
(Continued)

OTHER PUBLICATIONS

Machnine translation of Japan Patent document No. 63-150,112, Jul. 2017.*

*Primary Examiner* — Geoffrey S Evans
(74) *Attorney, Agent, or Firm* — Foster Pepper PLLC

(57) ABSTRACT

The present invention provides a plural resistance-capacitance (PRC) electrical discharge machining system comprising a control module, a digital electronic module, a driving module, and a discharge module. The control module allows the user to input a command and output a control signal accordingly. The digital electronic module processes the control signal and outputs a sequence signal to the driving circuit. The driving module amplifies the sequence signal and then outputs a driving signal to the discharge module. The discharge module then controls and drives a plurality of transistors to open circuits and break circuits according to the driving signal for controlling the charging and discharging of a plurality of capacitors of the discharge module in the electrical discharge machining. The present invention can increase the amount of discharge in a machining process, and improves the efficiency thereof.

9 Claims, 6 Drawing Sheets

(56) References Cited

U.S. PATENT DOCUMENTS

| | | | | | |
|---|---|---|---|---|---|
| 4,392,043 | A | * | 7/1983 | Inoue | B23H 1/022 219/69.18 |
| 5,182,474 | A | * | 1/1993 | Kaneko | B23H 1/022 219/69.16 |
| 6,472,630 | B1 | * | 10/2002 | Lin | B23H 1/022 219/69.13 |
| 2014/0083980 | A1 | * | 3/2014 | Mai | B23H 1/022 219/69.13 |

FOREIGN PATENT DOCUMENTS

| | | | | |
|---|---|---|---|---|
| JP | 59-59319 | A | * | 4/1984 |
| JP | 63-150112 | A | * | 6/1988 |
| TW | 183684 | | | 7/1991 |
| TW | 483789 | B | | 4/2002 |
| TW | 200616742 | | | 6/2006 |
| TW | 201114530 | A | | 5/2011 |
| TW | I343847 | B | * | 6/2011 |
| TW | 201232988 | A | | 8/2012 |

\* cited by examiner

PLURAL RESISTANCE-CAPACITANCE (PRC) ELECTRICAL DISCHARGE MACHINING SYSTEM

PRIORITY CLAIM

This application claims the benefit of the filing date of China Patent Application No. 103118922, filed May 30, 2014, entitled "A PLURAL RESISTANCE-CAPACITANCE (PRC) ELECTRICAL DISCHARGE MACHINING SYSTEM," and the contents of which are hereby incorporated by reference in their entirety.

FIELD OF THE INVENTION

The present invention relates to a plural resistance-capacitance (PRC) electrical discharge machining (EDM) system, and more particularly to an EDM system having a plurality of transistors to control a plurality of capacitors for charging and discharging.

BACKGROUND

In recent years, a lot of progress was made in semiconductors, electronics, and mechanical technology. The development of high-tech products is starting to head towards minimization and attention to detail. The EDM (electric discharge machining) is one of the main machining methods, and thus many manufacturers are working on improving the discharge power source of the EDM system.

Because of the enhanced emphasis on improving the discharge power source of the EDM system, many manufacturers have begun applying patents for the power source they developed, such as U.S. Pat. No. 6,465,754 B1 from Charmilles Co. Ltd. The circuit of U.S. Pat. No. 6,465,754 B1 uses the AC voltage of ultra hyper frequency in 0.1~10 MHz to vibrate and collide the positive ions and the negative ions in order to create an arc, without touching the work piece. Therefore, there is no electrolysis on the work piece. After creating the arc, the circuit switches to discharge from the negative electrode to increase the cutting rate of the EDM process. Mitsubishi Co. Ltd. has U.S. Pat. No. 6,727,455 B1 which mentions that the remaining energy in the discharge gap after discharging will affect the discharge gap during the next discharge and the surface roughness of the work piece. So, when alternatively discharging, Mitsubishi Co. Ltd. uses the discharge circuits of opposite polarity to remove the remaining energy in the discharge gap in order to increase the discharging frequency and efficiency. Another company, Sodick Co. Ltd, has published U.S. Pat. No. 6,130,395 A, which uses two DC voltages that correspond to two transistors. First by using rough machining, then precious machining, and then successfully making the surface roughness Rmax smaller than 1 µm. The industrial technology research institute has a patent I 413,559 which uses two set power source modules: a high voltage arcing power module and a low voltage discharging power module. The high voltage arcing power is mainly used for triggering the discharging phenomenon and the low voltage discharging power mainly for machining. After the high voltage arcing, the circuit will detect the voltage to adjust the low voltage and to precisely control each time the machining energy discharges, in order to achieve a high power saving efficiency. Yan Mu-Tian et al. published a patent I 357,840 which is also about the power of an EDM system. The circuit in I 357,840 uses a bridge converter to make a DC power that switches the output power between the positive electrode and the negative electrode in order to stabilize the power supplied and to also prevent electrolysis during the EDM process to decrease the degenerated layer on the work piece. Meanwhile, in the circuit of I 357,840, the circuit for releasing unnecessary voltage during the EDM process is added to prevent a positive (or negative) electrode that is discharging to be affected by a previous negative (or positive) electrode discharging. The circuit for releasing unnecessary voltage during the EDM process can reduce the loss in rapid discharging, increasing the efficiency of the process.

In the current technology for an EDM system there are two kinds of discharging circuits in the EDM system, a transistor discharging circuit, and a single resistance-capacitor discharging circuit. The transistor discharging circuit releases too much power during each discharge, so that removing more material during each discharge makes a quicker machining speed. The problem is that the machining precision is not good enough for micro machining. In view of this, the single resistance-capacitor discharging circuit is often used in micro machining. The single resistance-capacitor discharging circuit uses the charging-discharging principle of a capacitor, in order to generate high currents in a flash, which makes the electron jump between the cutting tool and the work piece and generates a high temperature of almost 10 thousand Celsius to remove the material. Although the high temperature is generated each discharge, each discharge happens in a relatively short time, requires a low amount of energy, and removes small amounts of material. Thus, it can maintain good surface roughness. But the single resistance-capacitor discharging circuit needs to meet the two electrodes in a specific small distance when the capacitor is at full charge and discharging. The known single resistance-capacitor discharging circuit uses a single capacitor for discharging, and thus the discharging times are small in a fixed period of time, causing the machining efficiency to be stagnant.

SUMMARY OF THE INVENTION

In view of the above, the present invention provides a plural resistance-capacitance (PRC) electrical discharge machining system which uses charging-discharging units composed of a plurality of transistors and capacitors in order to discharge in a time sequence to increase the discharge times in a fixed period of time, and to improve the EDM manufacturing process. The plurality resistance-capacitance (PRC) electrical discharge machining system comprises a control module, a digital circuit module, a driving circuit module, and a discharge circuit module, wherein the control module can be a computer. A user inputs a command to the control module and the control module outputs a corresponding control signal which is then used to control the EDM system. The digital circuit module can be a programmable logic device (PLD) which is used to process the control signal to output a corresponding time-sequential signal. The driving circuit module is used to amplify the time-sequential signal and output a corresponding driving signal to the discharge circuit module. The discharge circuit module comprises a plurality of transistors and a plurality of capacitors, and controls the plurality of transistors to switch between an open circuit and a close circuit in a high frequency according to the driving signal so as to control the charging and discharging sequence of the plurality of capacitors to perform an electrical discharge machining (EDM) process to a work-piece. The high frequency is between 0.1 to 10 MHz.

The charging time can be obtained by formula 1 and adding other capacitors while the capacitor is charging, then discharging the other capacitors to increase the efficiency of the EDM system. The present invention lets all the capacitors become fully charged, and then discharges from the capacitor C1. After the capacitor C1 finishes discharging, the capacitor C2 continues to discharge. Meanwhile, the capacitor C1 charges until the capacitor C2 finished discharging, and so on.

$$\tau_N = C \times R \Big/ K \left[ K = 1 \Big/ \ln\left(\frac{1}{1 - E_d/E_0}\right) \right] \quad (1)$$

Compared to the prior arts, the plural resistance-capacitance (PRC) electrical discharge machining system provided by the present invention can increase the discharge times of the EDM manufacturing process in a fixed period of time, while also improving the machining efficiency of the single resistance-capacitor circuit. Because each discharge time of the present invention is shorter than the prior art, the work piece can then have a good surface roughness after the machining process. An experiment has confirmed that the present invention improved the feeding rate 60% over the prior arts.

DETAILED DESCRIPTION

The embodiments and the practical applications of the present invention will be described in the following paragraphs, so as to sufficiently explain the characteristics, spirits, and advantages of the invention.

Figure 1:
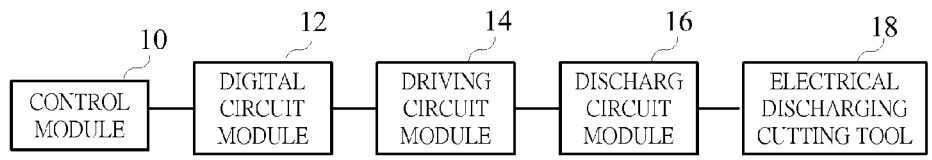
FIG. 1 is a function block diagram according to an embodiment of the invention.
Figure 2:
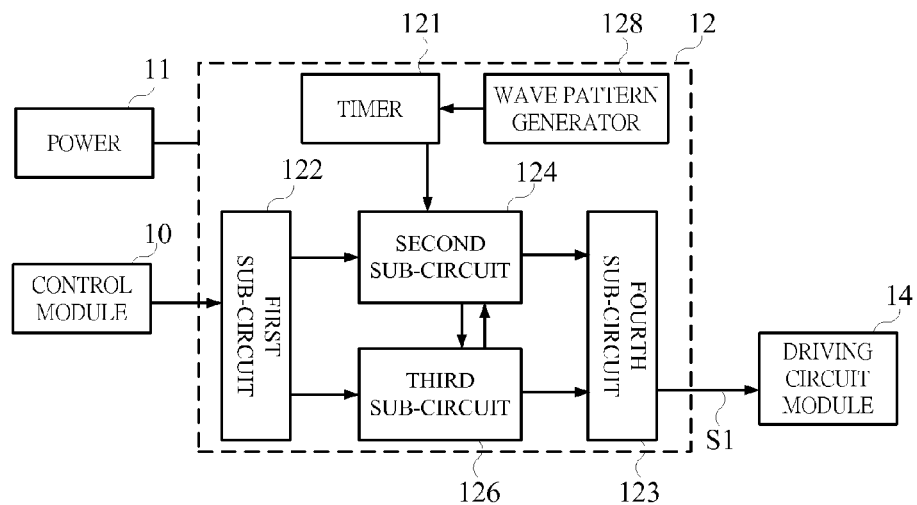
FIG. 2 is a function block diagram illustrating the details of the digital circuit module according to an embodiment of the invention.
Figure 3:
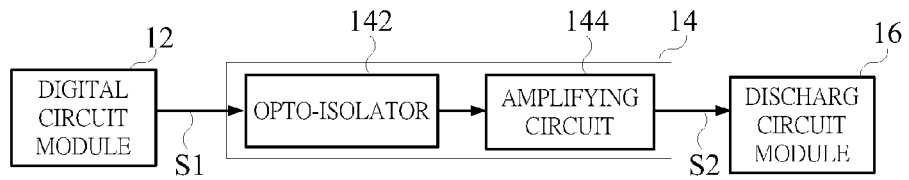
FIG. 3 is a function block diagram illustrating the details of the driving circuit module according to an embodiment of the invention.

Please refer to FIG. 1 to FIG. 3. FIG. 1 is a function block diagram according to an embodiment of the invention, while FIG. 2 is a function block diagram illustrating the details of the digital circuit module according to an embodiment of the invention. FIG. 3 is a function block diagram illustrating the details of the driving circuit module according to an embodiment of the invention.

As shown in FIG. 1, the present invention of the plural resistance-capacitance (PRC) electrical discharge machining (EDM) system 1 comprises a control module 10, a digital circuit module 12, a driving circuit module 14, a discharge circuit module 16, and an EDM device 18, wherein the control module 10 can be a computer that allows a user to input commands to control the plural resistance-capacitance (PRC) electrical discharge machining (EDM) system 1. The digital circuit module 12 can be a programmable logic device (PLD) which is used to process the control signal in order to output a corresponding time-sequential signal. The control module 10 and the digital circuit module 12 are not limited to the computer and the programmable logic device mentioned above, as the user can replace the previously mentioned devices with any other device that can meet the efficacy needed for the present invention. The driving circuit 14 comprises an amplifying circuit 144 for amplifying the time-sequential signal. The amplifying circuit 144 can be a voltage amplifying circuit, and the present invention is not limited to the voltage amplifying circuit. The amplifying circuit 144 can also be a current amplifying circuit or any other device that can meet the efficacy needed for the present invention. The discharge circuit module 16 comprises a plurality of transistors and a plurality of capacitors, where the plurality of transistors control the charge/discharge of the plurality of capacitors. The EDM device 18 performs the electrical discharging machining directly to a work piece waiting for machining.

The control module 10 is electrically coupled to the digital circuit module 12, the digital circuit module 12 is electrically coupled to the driving circuit module 14, the driving circuit module 14 is electrically coupled to the discharge circuit module 16, and the discharge circuit module 16 is electrically coupled to the EDM device 18. Thus the plural resistance-capacitances (PRC) electrical discharge machining system 1 is formed.

Figure 4:
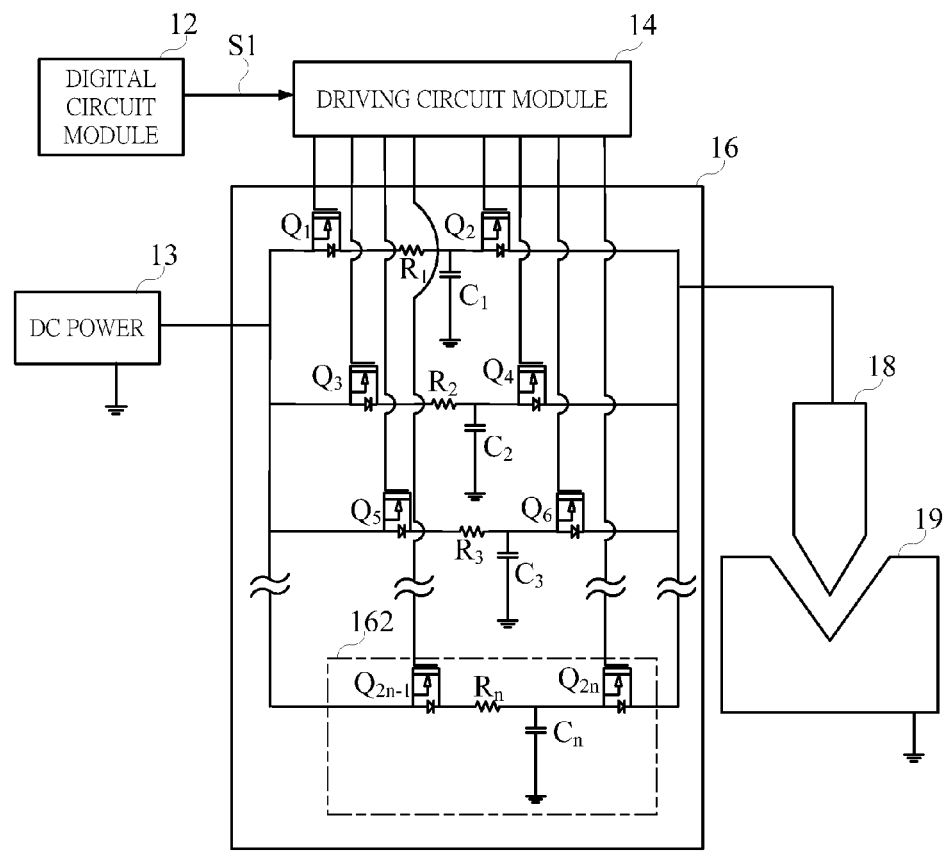
FIG. 4 is a circuit diagram illustrating the discharge circuit module according to an embodiment of the invention.

Please refer to FIG. 2 to FIG. 4. FIG. 2 is a function block diagram illustrating the details of the digital circuit module according to an embodiment of the present invention. FIG. 3 is a function block diagram illustrating the details of the driving circuit module according to an embodiment of the invention. FIG. 4 is a circuit diagram illustrating the discharge circuit module according to an embodiment of the present invention.

As shown in FIG. 2, a user inputs a command into the control module 10, and then the control module 10 outputs the corresponding control signal to the digital circuit module 12. The digital circuit module 12 processes the control signal to output the corresponding time-sequential signal S1. The time-sequential signal S1 is inputted to the driving circuit module 14 by the digital circuit module 12. The amplifying circuit 144 of the driving circuit module 14 amplifies the time-sequential signal S1 in order to form a corresponding driving signal S2. The driving circuit module 14 outputs the driving signal S2 to the discharge circuit module 16. The discharge circuit module 16 controls the plurality of transistors to switch between an open circuit and a close circuit in high frequency according to the driving signal S2. Then, controlling the charge/discharge time sequence of the capacitors, and introducing the electricity discharged from the capacitors to the EDM device 18 to perform the electrical discharge machining (EDM) process to a work-piece. The high frequency mentioned above is between 0.1 to 10 MHz.

Because the control module 10 is electrically coupled to the digital circuit module 12, the user can modify the parameters of the EDM system in real time while the plural resistance-capacitances (PRC) electrical discharge machining (EDM) system 1 performs the EDM manufacturing process and smoothly enhances the efficacy of the EDM process and the manufacturing process. Because the resistance-capacitor discharging circuit can provide a discharging current with a short impulse and high peak value, the time needed for the material to be removed from the work piece from machining is less than the prior art, and thus improves the surface roughness.

Please refer to FIG. 2 again. In this embodiment the digital circuit module 12 further comprises a first sub-circuit 122, a second sub-circuit 124, a third sub-circuit 126, a wave pattern generator 128, a timer 121, and a fourth sub-circuit 123, wherein the second sub-circuit 124 can be a configurable logic block (CLB) and the third sub-circuit 126 can be a programmable interconnect block (PIB). The wave pattern generator 128 can be an oscillator or a function generator.

First, activating a power 11 which is electrically coupled to the digital circuit module 12 and then inputting the control signal that is outputted from the control module 10 to the first sub-circuit 122. The first sub-circuit 122 outputs the control signal to the second sub-circuit 124 and the third sub-circuit 126, wherein the second sub-circuit 124 can generate logical gates, such as adding, subtracting, and inverting. These logical gates combine together through the third sub-circuit 126 to form a logical program. A high frequency timing signal is generated by the wave pattern generator 128 and the timer 121, and the timing signal is transferred to the second sub-circuit 124 and then combined to the logical program to generate the time-sequential signal S1. The time-sequential signal S1 is outputted to the driving circuit module 14 by the fourth sub-circuit 123. The high frequency mentioned above is between 0.1 to 10 MHz.

Please refer to FIG. 3. FIG. 3 is a function block diagram illustrating the details of the driving circuit module 14 according to an embodiment of the present invention. The driving circuit module 14 further comprises an opto-isolator 142 to protect the time-sequential signal S1 from the noise generated during the EDM process. The time-sequential signal S1, which is outputted by the fourth sub-circuit 123, is outputted to the opto-isolator 142 to isolate the time-sequential signal S1 and protect the digital circuit module 12 from the noise generated during the EDM process. The time-sequential signal S1 is amplified by the amplifying circuit 144 and then forms the driving signal S2. The driving signal S2 is then outputted to the discharge circuit module 16, and drives the plurality of transistors of the discharge circuit module 16 to switch between an open circuit and a close circuit in a high frequency so as to control the charging and discharging sequence of the plurality of capacitors in order to perform an electrical discharge machining (EDM) process to a work-piece. The high frequency is between 0.1 to 10 MHz.

Please refer to FIG. 4. FIG. 4 is a circuit diagram illustrating the discharge circuit module according to an embodiment of the invention. As shown in FIG. 4, one end of the discharge circuit module 16 is electrically coupled to a DC power 13, while the other end is electrically coupled to the EDM device 18. A work piece 19 is disposed under the EDM device 18.

The discharge circuit module 16 comprises a plurality of charge-discharge units 162. In this embodiment, each charge-discharge units 162 comprises two transistors, a capacitor, and a resistor. The capacitor and the resistor are coupled in series between the two transistors, while each charge-discharge unit 162 is electrically coupled in parallel.

The transistors $Q_1$ and $Q_2$ control the charge/discharge sequence of the capacitor $C_1$. The transistors $Q_3$ and $Q_4$ control the charge/discharge sequence of the capacitor $C_2$. The transistors $Q_5$ and $Q_6$ control the charge/discharge sequence of the capacitor $C_3$. Continuing on, the transistor $Q_{2n-1}$ and $Q_{2n}$ control the charge/discharge sequence of the capacitor $C_n$, wherein n is a non-zero positive integer. The charging time for the capacitor $C_n$ can be obtained through the formula 1, wherein $\tau_N$ is the charging time, C is the capacitor, R is the resistor, $E_d$ is the discharging voltage, and $E_0$ is the voltage of the DC power 13. After acquiring the charging time of each of the capacitors, adding other capacitors while the capacitor is charging and then discharging the other capacitors increases the efficacy of the EDM system.

$$\tau_N = C \times R \Big/ K \Big[ K = 1 \Big/ \ln\Big(\frac{1}{1 - E_d/E_0}\Big) \Big] \tag{1}$$

Figure 5:
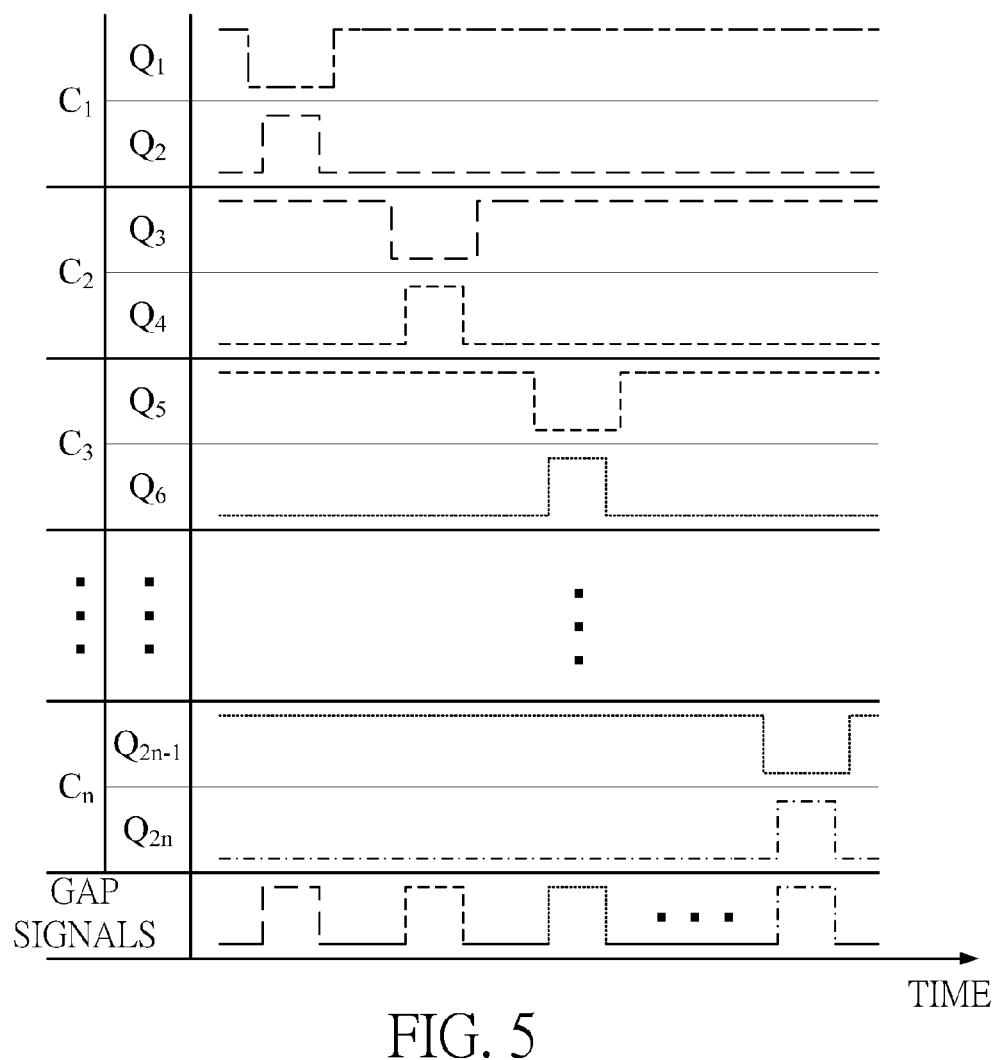
FIG. 5 is a wave pattern diagram illustrating the plurality of capacitors of the discharge circuit module according to an embodiment of the invention.

Please refer to FIG. 5. FIG. 5 is a wave pattern diagram illustrating the plurality of capacitors of the discharge circuit module according to an embodiment of the present invention. First, look at the top of FIG. 5, where the valley of the square wave of the transistor $Q_1$ represents the open circuit of the transistor $Q_1$, while the peak of the square wave of the transistor $Q_2$ represents the closed circuit of the transistor $Q_2$. Overlapping the square wave pattern of the capacitor $Q_1$ and $Q_2$ can obtain a discharging period of the capacitor $C_1$, as the gap signals shows in FIG. 5.

Please refer to FIG. 5 again. The wave pattern design of the discharge circuit module 16 is adding multiple charging/discharging periods of the charge-discharge units 162 in one charging/discharging period of one of the charge-discharge units 162. The capacitors $C_1$ to $C_N$ are discharging in sequence according to the arrangement of the digital circuit module 12 as the gap signals shows in FIG. 5. In other words, after the capacitor $C_1$ finishes discharging, the capacitor $C_2$ continues to discharge, then the capacitor $C_3$ continues to discharge, and so on till the capacitor $C_N$ finishes discharging. After that, the discharging sequence loops back to the capacitor $C_1$. The present invention uses multiple sets of charge-discharge units 162 in order to discharge in sequence to increase the discharge times of the EDM device 18 to the work piece 19 in a fixed period of time.

Figure 6:
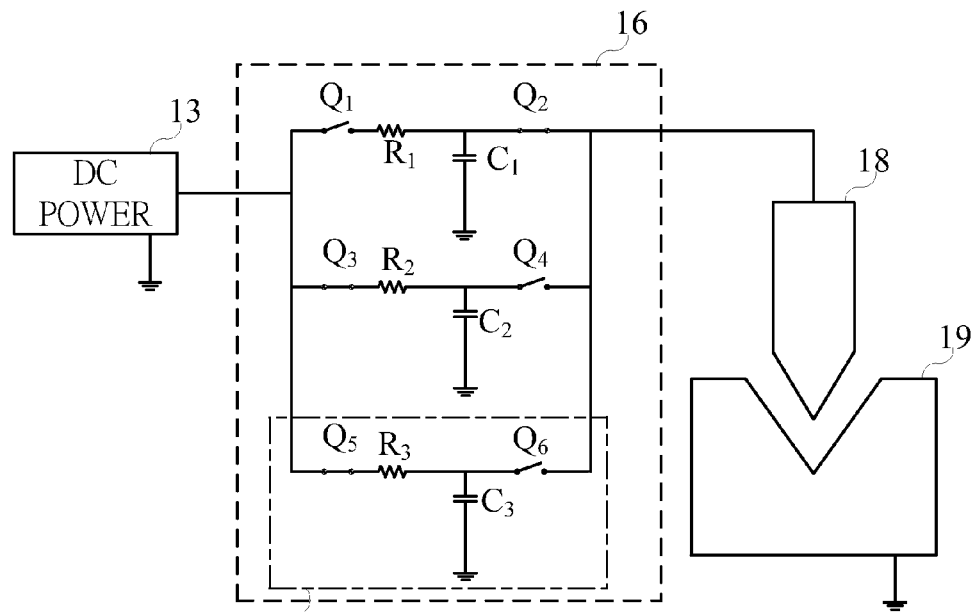
FIG. 6 is a circuit diagram illustrating the capacitor $C_1$ discharging according to another embodiment of the invention.
Figure 7:
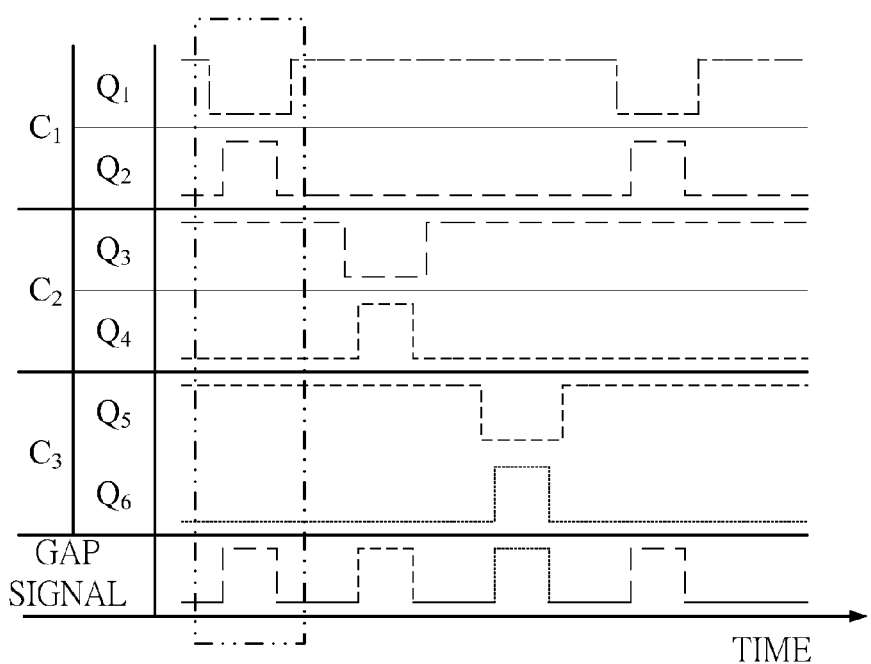
FIG. 7 is a wave pattern diagram illustrating the transistors $Q_1$ and $Q_2$ switching while the capacitor $C_1$ is discharging according to FIG. 6.

Next, please refer to FIG. 6 and FIG. 7. FIG. 6 is a circuit diagram illustrating the capacitor $C_1$ discharging according to another embodiment of the present invention. FIG. 7 is a wave pattern diagram illustrating the transistors $Q_1$ and $Q_2$ switching while the capacitor $C_1$ discharges according to FIG. 6.

In this embodiment, there are three charge-discharge units 162, which means that N=3, that demonstrate how the transistors $Q_1$ and $Q_2$ control the discharge of the capacitor $C_1$, wherein the circuit switch symbols represent the open/closed circuit of the transistors. As shown in FIG. 6, the transistor $Q_1$ is opening and the transistor $Q_2$ is closing. That means that the capacitor $C_1$ is fully charged and discharging, as shown in the marked region of FIG. 7. When the capacitor $C_1$ is discharging, the transistor $Q_2$ is closing, and the transistors $Q_4$ and $Q_6$ are opening in order to prevent the discharged charge from the capacitor $C_1$ from charging the capacitors $C_2$ and $C_3$. Meanwhile, the transistor $Q_1$ is opened to prevent using the charge that the capacitors $C_2$ and $C_3$ saved while the capacitor $C_1$ is discharging. The transistors $Q_3$ and $Q_5$ are closed to charge the capacitors $C_2$ and $C_3$ and to continue waiting for the discharge.

Figure 8:
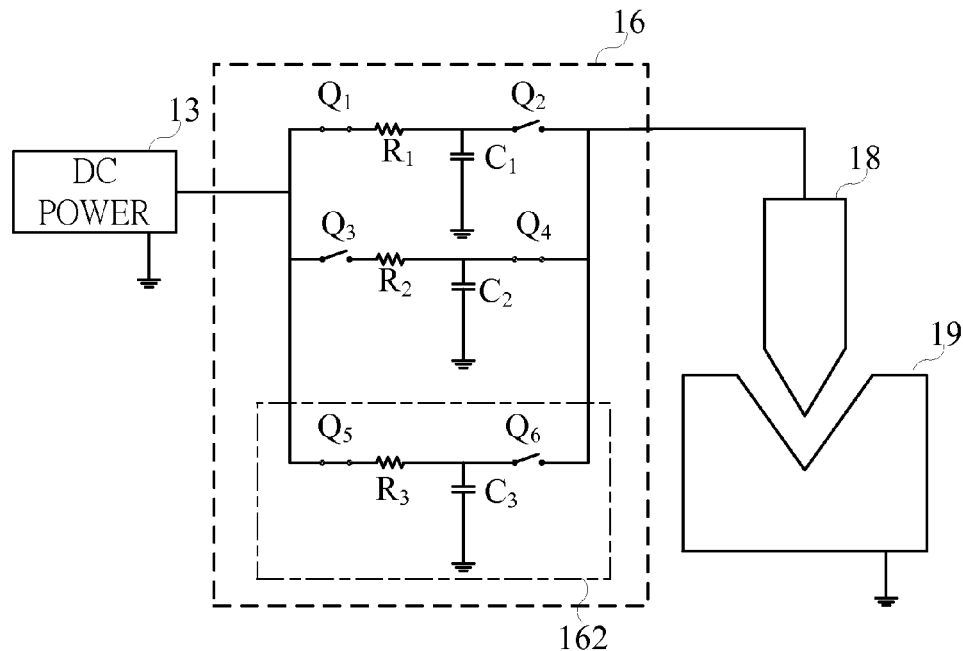
FIG. 8 is a circuit diagram illustrating the capacitor $C_2$ discharging according to another embodiment of the invention.
Figure 9:
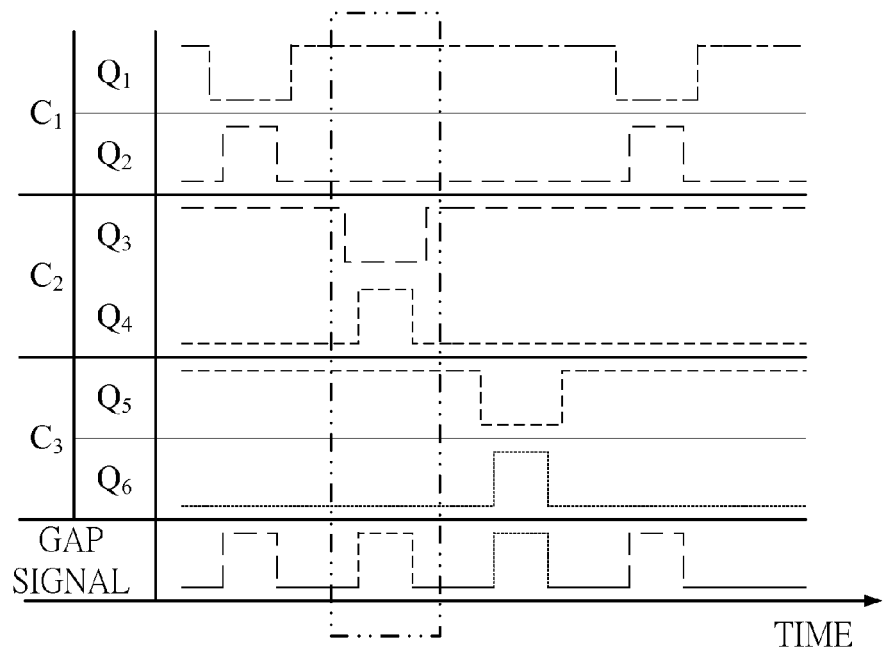
FIG. 9 is a wave pattern diagram illustrating the transistors $Q_3$ and $Q_4$ switching while the capacitor $C_2$ is discharging according to FIG. 8.

Next, please refer to FIG. 8 and FIG. 9. FIG. 8 is a circuit diagram illustrating the capacitor $C_2$ discharging according to another embodiment of the present invention. FIG. 9 is a wave pattern diagram illustrating the transistors $Q_3$ and $Q_4$ switching while the capacitor $C_2$ is discharging according to FIG. 8.

In this embodiment, after the capacitor $C_1$ finishes discharging, the capacitor $C_2$ is then controlled by the transistors $Q_3$ and $Q_4$ to continue the discharge, wherein the circuit switch symbols represent the open/closed circuit of the transistors. As shows in FIG. 8, the transistor $Q_3$ is opening and the transistor $Q_4$ is closing. This means that the capacitor $C_2$ is fully charged and discharging, as shows in the marked region of FIG. 9. When the capacitor $C_2$ discharges, the transistor $Q_4$ is closing, and the transistors $Q_2$ and $Q_6$ are opening in order to prevent the discharged charge from the capacitor $C_2$ from charging the capacitors $C_1$ and $C_3$. Meanwhile, the transistor $Q_3$ is opened in order to prevent using the charge that the capacitors $C_1$ and $C_3$ saved while the capacitor $C_2$ is discharging. The transistors $Q_1$ and $Q_5$ are closed in order to charge the capacitor $C_1$ and $C_3$, while waiting to continue discharging.

Figure 10:
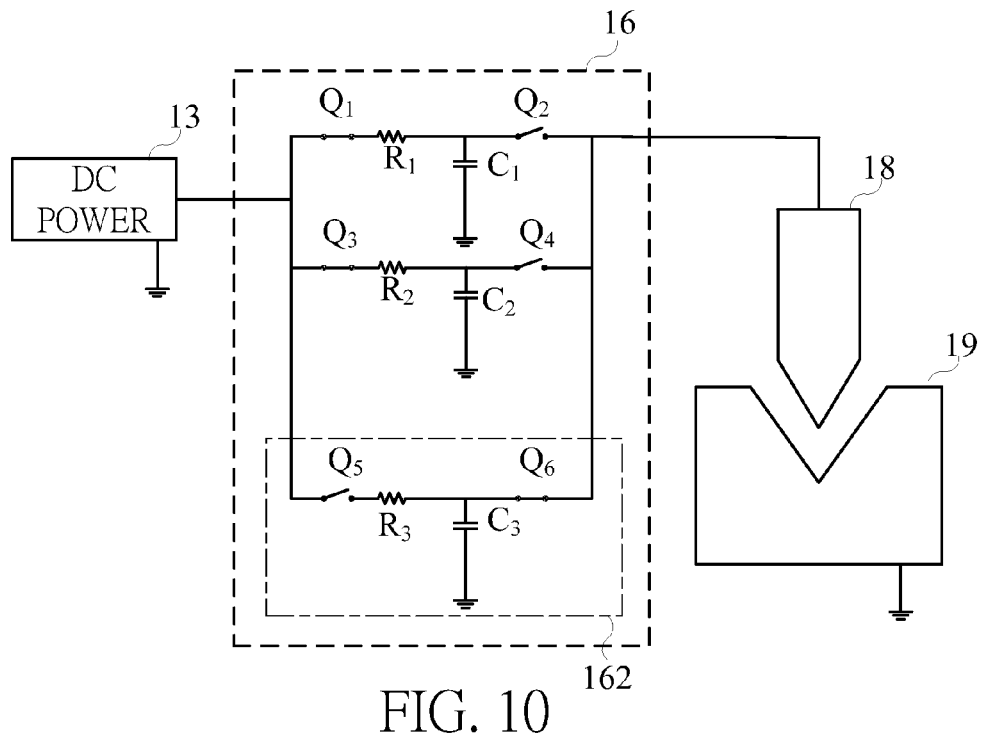
FIG. 10 is a circuit diagram illustrating the capacitor $C_3$ discharging according to another embodiment of the invention.
Figure 11:
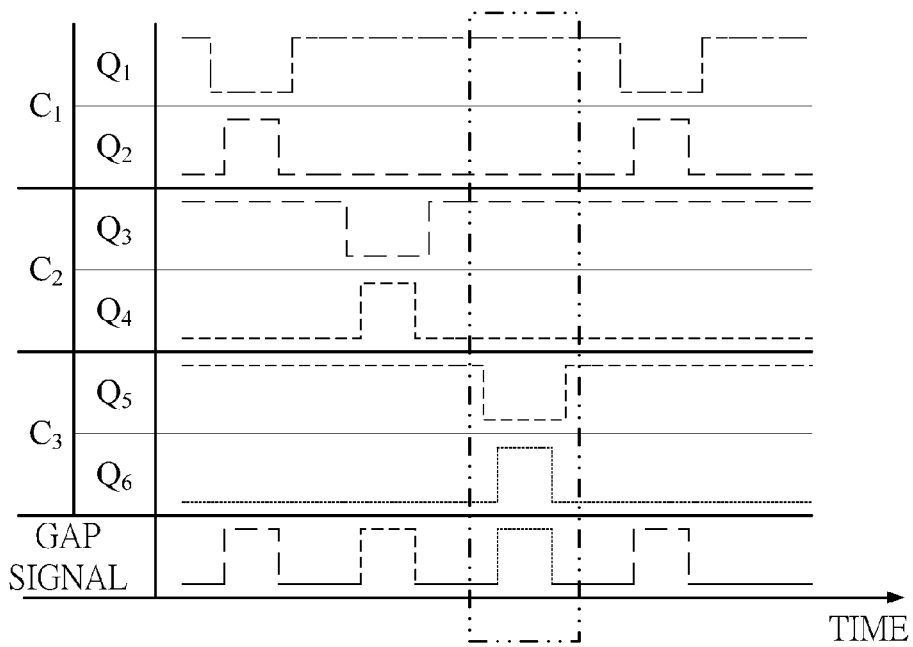
FIG. 11 is a wave pattern diagram illustrating the transistors $Q_5$ and $Q_6$ switching while the capacitor $C_3$ is discharging according to FIG. 10.

Next, please refer to FIG. 10 and FIG. 11. FIG. 10 is a circuit diagram illustrating the capacitor $C_3$ discharging according to another embodiment of the present invention. FIG. 11 is a wave pattern diagram illustrating the transistor $Q_5$ and $Q_6$ switching while the capacitor $C_3$ is discharging according to FIG. 10.

In this embodiment of the present invention, after the capacitors $C_1$ and $C_2$ finish discharging, the capacitor $C_3$ is controlled by the transistors $Q_5$ and $Q_6$ to continue to discharge, wherein the circuit switch symbols represent the open/closed circuit of the transistors. As shows in FIG. 10, the transistor $Q_5$ is opening and the transistor $Q_6$ is closing. In other words, the capacitor $C_3$ is fully charged and discharging, as shows in the marked region of FIG. 11. When the capacitor $C_3$ is discharging, the transistor $Q_6$ is closing, and the transistors $Q_2$ and $Q_4$ are opening in order to prevent the discharged charge from the capacitor $C_3$ from charging the capacitor $C_1$ and $C_2$. Meanwhile, the transistor $Q_5$ is opening in order to prevent using the charge that the capacitor $C_1$ and $C_2$ saved while the capacitor $C_3$ is discharging, while the transistors $Q_1$ and $Q_3$ are closing in order to charge the capacitors $C_1$ and $C_2$ and waiting to continue discharging. Combining the discharge steps of each capacitor from FIG. 6 to FIG. 11, a discharge circle is formed for the plural resistance-capacitances (PRC) electrical discharge machining (EDM) system performing the electrical discharge machining process.

In summary, the present invention provides a plural resistance-capacitance (PRC) electrical discharge machining (EDM) system that utilizes a control module for inputting command and outputting the control signal that corresponds to the command. The control signal is processed by the digital circuit module and outputs the time-sequential signal. The time-sequential signal is amplified by the driving circuit module and forms the driving signal, to which the driving signal is then outputted to the discharge circuit module. The driving signal controls and drives the plurality of transistors to switch between an open circuit and a close circuit in a high frequency so as to control the charging and discharging sequence of the plurality of capacitors in order to perform an electrical discharge machining (EDM) process to a workpiece. The high frequency is between 0.1 to 10 MHz.

Compared to the prior arts, the plural resistance-capacitance (PRC) electrical discharge machining (EDM) system uses a plurality of transistors to control a plurality of capacitors charging/discharging multiple times in high frequency, discharges to an EDM device according to a time sequence, enhances the discharge times of the EDM process in a fixed period of time, and improves the efficiency of the electrical discharge machining (EDM) process. It is because of the single discharge time and the discharging energy being less than the prior arts that the work piece can have good surface roughness after the machining process.

With the example and explanations above, the features and spirits of the invention will be hopefully well described. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A plural resistance-capacitance (PRC) electrical discharge machining system, comprising:
   a control module, receiving an input command from a user and outputting a corresponding control signal;
   a digital circuit module, electrically coupled to the control module, the digital circuit module processing the control signal for outputting a corresponding time-sequential signal;
   a driving circuit module, electrically coupled to the digital circuit module, comprising an amplifying circuit for amplifying the time-sequential signal and outputting a corresponding driving signal; and
   a discharge circuit module, electrically coupled to the driving circuit module, comprising a plurality of transistors and a plurality of capacitors, where the discharge circuit module controls the plurality of transistors that are to be switched between an open circuit and a closed circuit according to the driving signal so as to control a charging and discharging sequence of the plurality of capacitors for performing an electrical discharge machining (EDM) process to a work-piece;
   wherein the digital circuit module further comprises:
      a first sub-circuit, for receiving the control signal;
      a second sub-circuit, electrically coupled to the first sub-circuit for generating a plurality of logical gates according to the control signal;
      a third sub-circuit, electrically coupled to the first sub-circuit and the second sub-circuit for integrating the logical gates according to the control signal and generating a logical program; and
      a wave pattern generator, electrically coupled to the second sub-circuit for generating a timing signal;
   wherein the control signal is inputted to the second sub-circuit and the third sub-circuit through the first sub-circuit, the second sub-circuit generates the logical gates according to the control signal and outputs the logical gates to the third sub-circuit, the third sub-circuit arranges the logical gates according to the control signal and outputs the logical program to the second sub-circuit, and the timing signal outputted from the wave pattern generator is integrated with the logical program to form the time-sequential signal.

2. The plural resistance-capacitance (PRC) electrical discharge machining system of claim 1, wherein the digital circuit module comprises a programmable logic device (PLD).

3. The plural resistance-capacitance (PRC) electrical discharge machining system of claim 1, wherein the wave pattern generator comprises an oscillator or a function generator.

4. The plural resistance-capacitance (PRC) electrical discharge machining system of claim 1, wherein the second sub-circuit comprises a configurable logic block (CLB), and the third sub-circuit comprises a programmable interconnect block (PIB).

5. The plural resistance-capacitance (PRC) electrical discharge machining system of claim 1, wherein the amplifying circuit comprises a voltage amplifying circuit or a current amplifying circuit.

6. The plural resistance-capacitance (PRC) electrical discharge machining system of claim 1, wherein the driving circuit module further comprises an opto-isolator for protecting the time-sequential signal from the noise generated from the EDM (electrical discharge machining) process.

7. The plural resistance-capacitance (PRC) electrical discharge machining system of claim 1, wherein the discharge circuit module comprises a plurality of charge-discharge units, each charge-discharge unit comprises at least two transistors and at least one capacitor, the capacitor is disposed between the transistors and connected to the transistors in series, and the charge-discharge units are connected to each other in parallel.

8. The plural resistance-capacitance (PRC) electrical discharge machining system of claim 7, wherein each charge-discharge unit comprises a plurality of resistors, each resistor is disposed between the transistors and the capacitors and connected to the transistors and the capacitors in series.

9. The plural resistance-capacitance (PRC) electrical discharge machining system of claim 8, further comprising a DC source and an EDM (electrical discharge machining) device, the DC source is coupled to the discharge circuit module for charging the capacitors, the EDM device is coupled to the discharge circuit module for receiving the electricity discharged from the discharge circuit module for performing the electrical discharge machining (EDM) process to the work-piece.

* * * * *